(12) United States Patent
Kubota

(10) Patent No.: US 8,170,336 B2
(45) Date of Patent: May 1, 2012

(54) IMAGE PROCESSING APPARATUS, IMAGE FORMING APPARATUS, IMAGE PROCESSING METHOD AND COMPUTER-READABLE RECORDING MEDIUM

(75) Inventor: Kazuhisa Kubota, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 944 days.

(21) Appl. No.: 12/182,855

(22) Filed: Jul. 30, 2008

(65) Prior Publication Data

US 2009/0033964 A1 Feb. 5, 2009

(30) Foreign Application Priority Data

Jul. 31, 2007 (JP) ................. P2007-200193

(51) Int. Cl.
*G06K 9/00* (2006.01)
(52) U.S. Cl. ...................................... 382/168
(58) Field of Classification Search .................. None
See application file for complete search history.

(56) References Cited

FOREIGN PATENT DOCUMENTS

| JP | 6-245003 A | 9/1994 |
|---|---|---|
| JP | 8-88312 A | 4/1996 |
| JP | 9-261383 A | 10/1997 |
| JP | 9-284490 A | 10/1997 |
| JP | 2002-77669 A | 3/2002 |
| JP | 2002077669 A | * 3/2002 |
| JP | 2005-286571 A | 10/2005 |
| JP | 2005286571 A | * 10/2005 |

* cited by examiner

*Primary Examiner* — Stephen R Koziol
*Assistant Examiner* — Nirav G Patel
(74) *Attorney, Agent, or Firm* — Birch, Stewart, Kolasch & Birch, LLP

(57) ABSTRACT

An average value calculating section calculates, for respective color components, an average value of pixel values within a pixel block, to define the calculated average values as a pixel value of a pixel of interest. A histogram generating section obtains, for respective pixels of interest, a maximum value of the average values among the color components and a maximum difference in the average values among the color components, and generates histograms respectively for the maximum value and the maximum difference in which histograms a number of pixels for a density bin is considered as a frequency-of-occurrence value. A determination section obtains numbers of density bins that correspond to a frequency-of-occurrence value greater than or equal to a predetermined frequency-of-occurrence value in the histograms, and determines that data of image is of a blank page image when both of the numbers of density bins are a bin threshold or less.

4 Claims, 13 Drawing Sheets

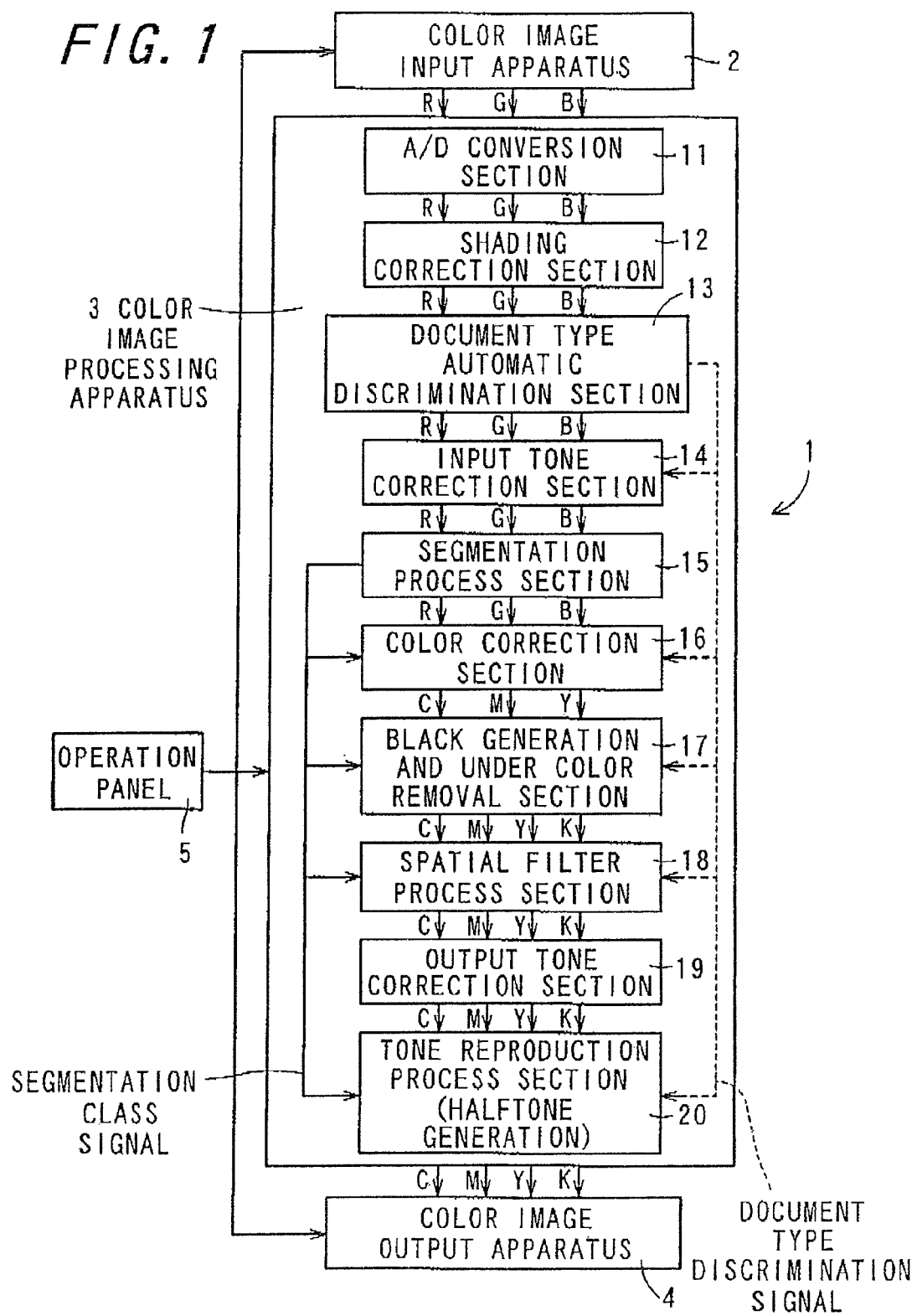

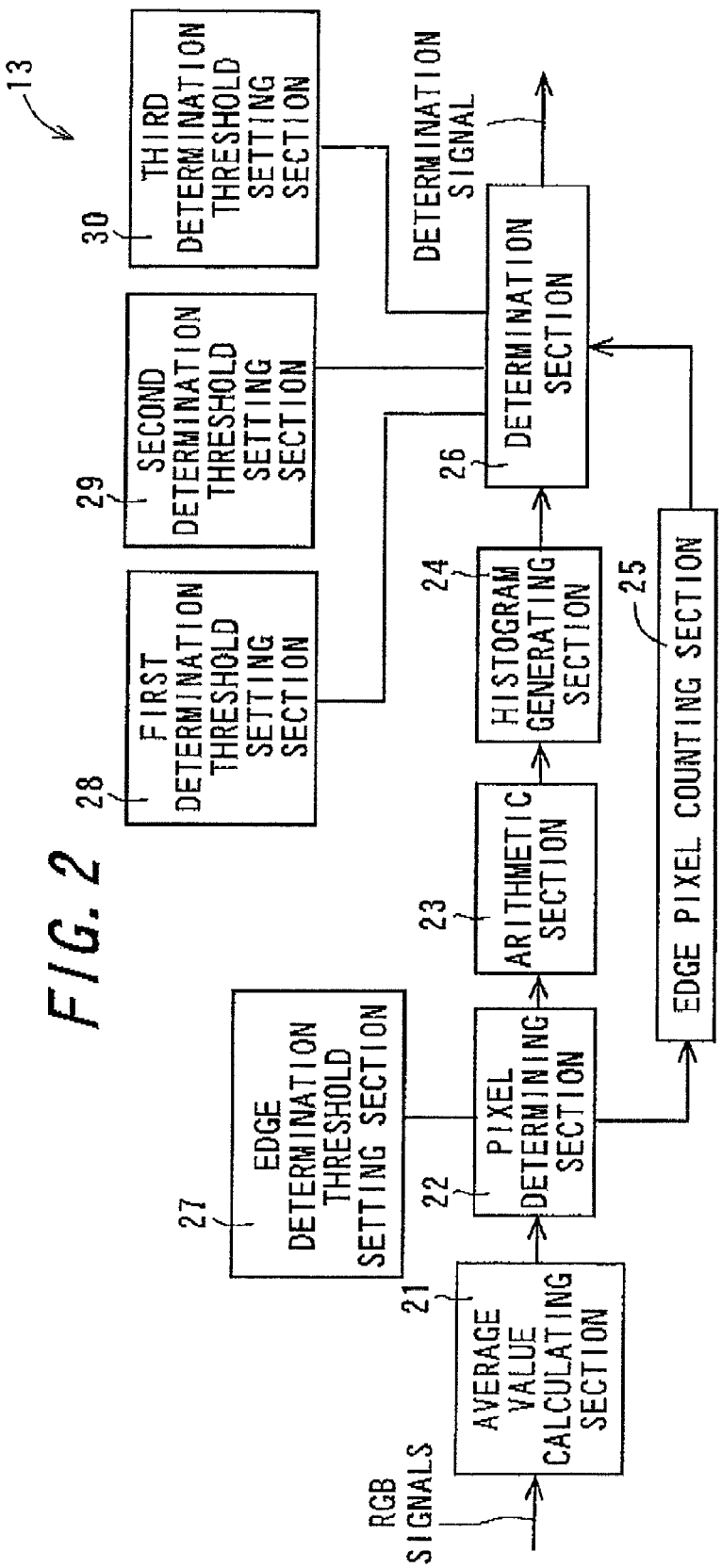

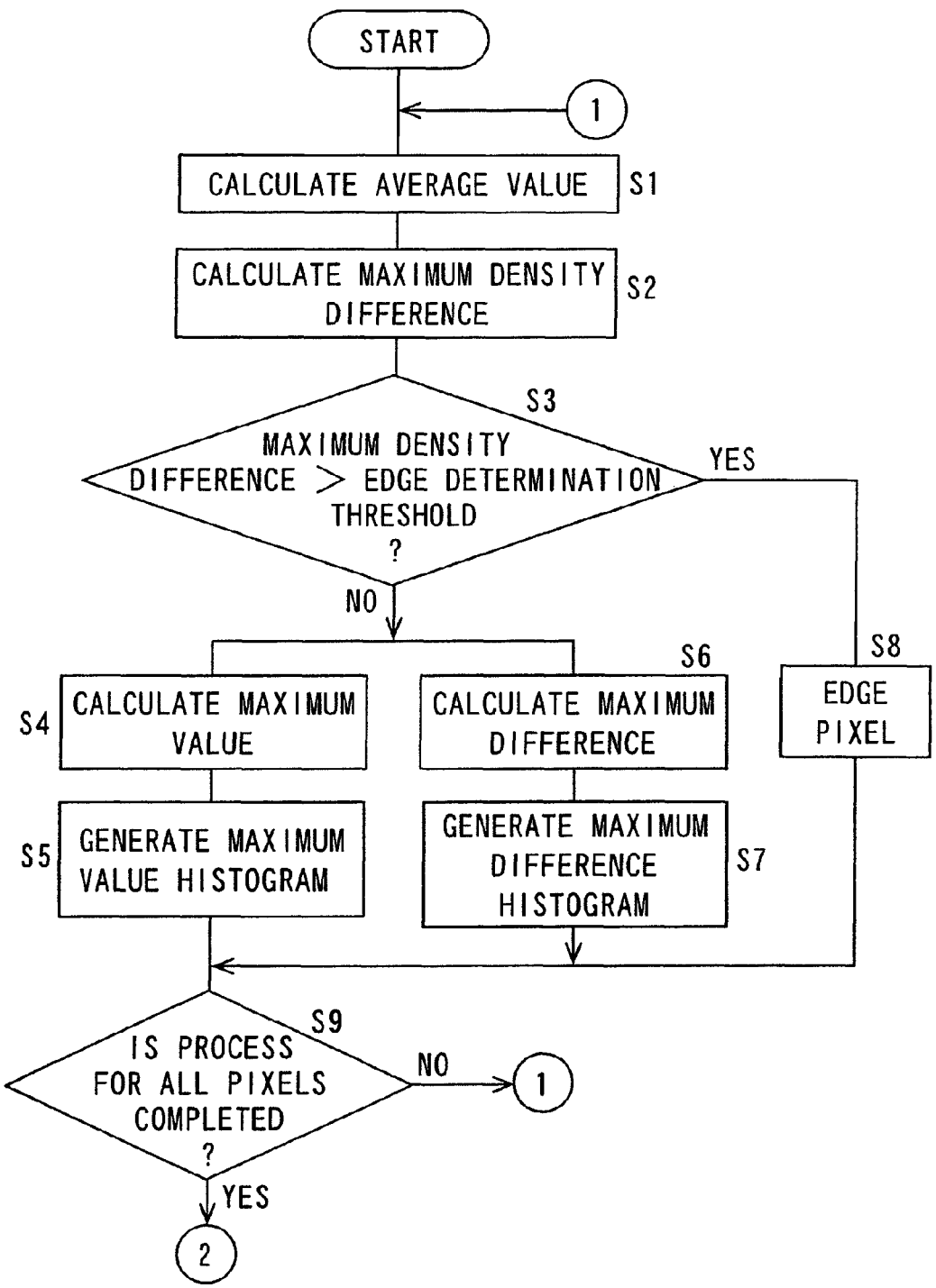

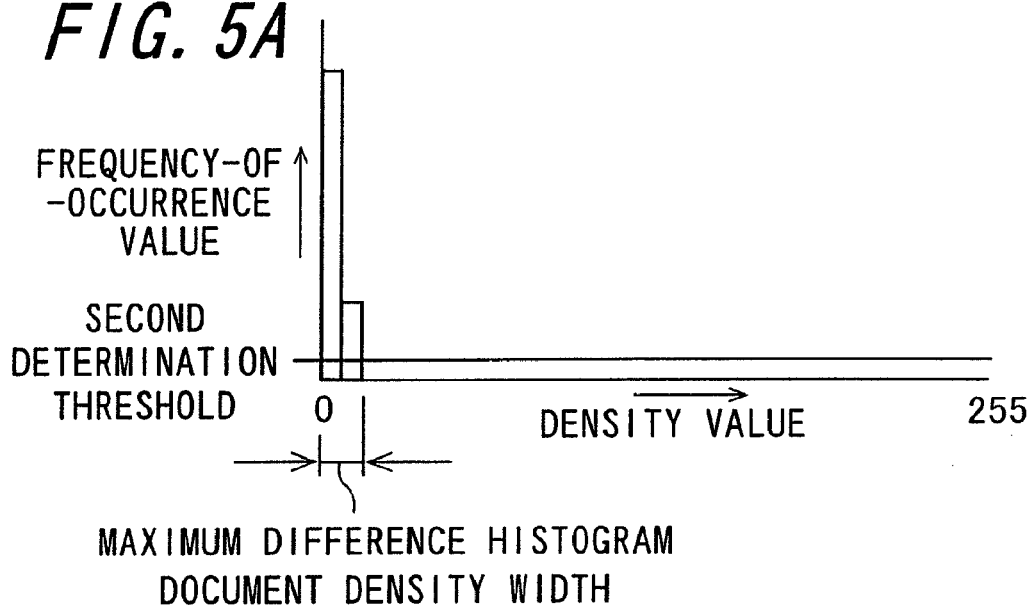
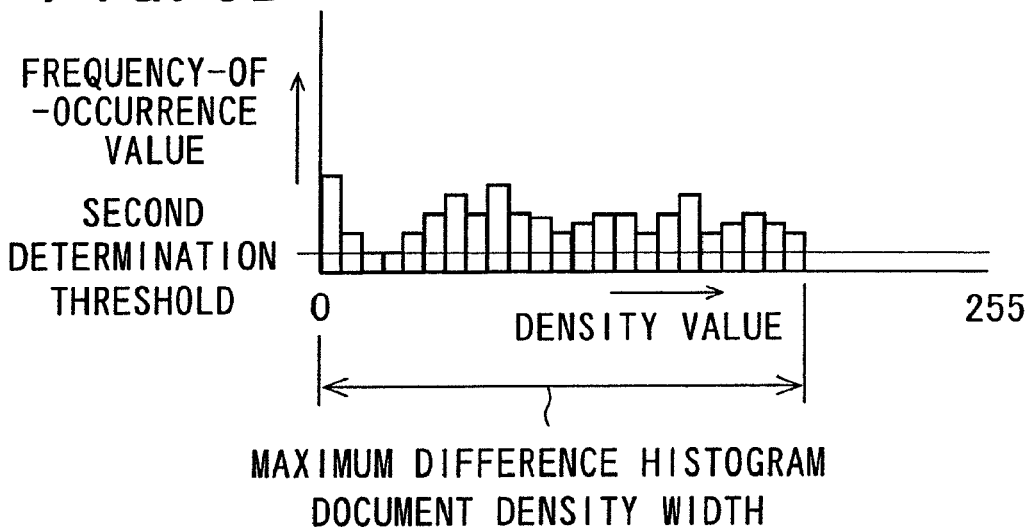

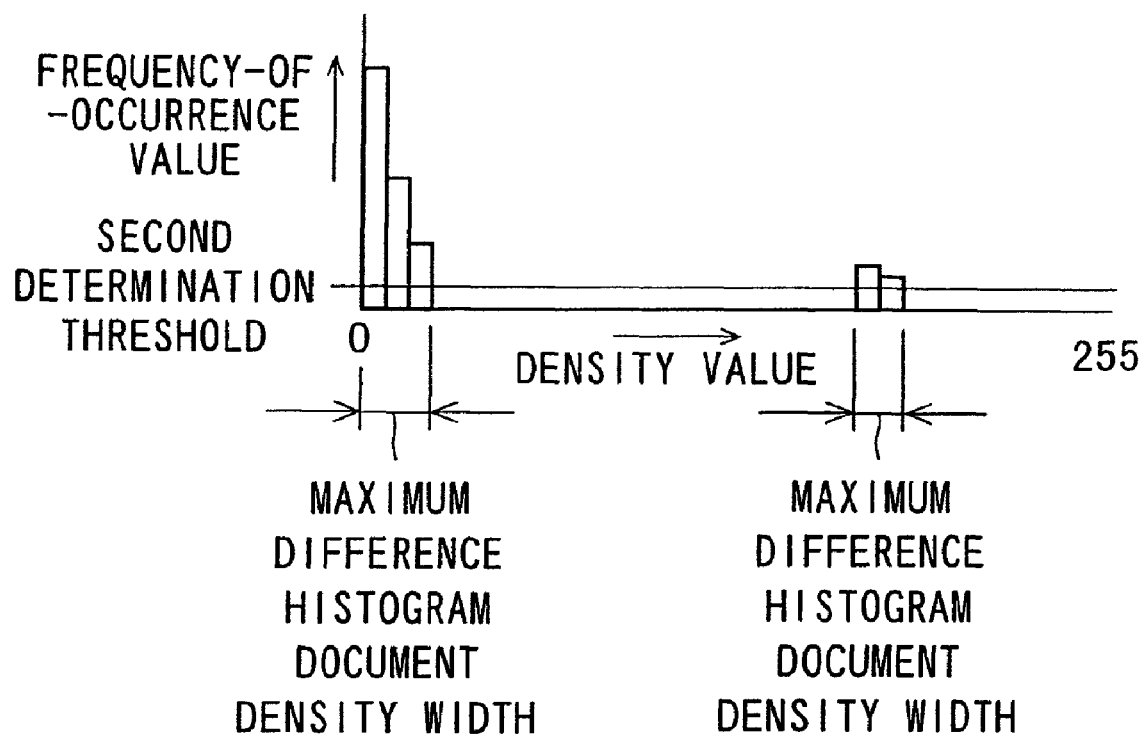

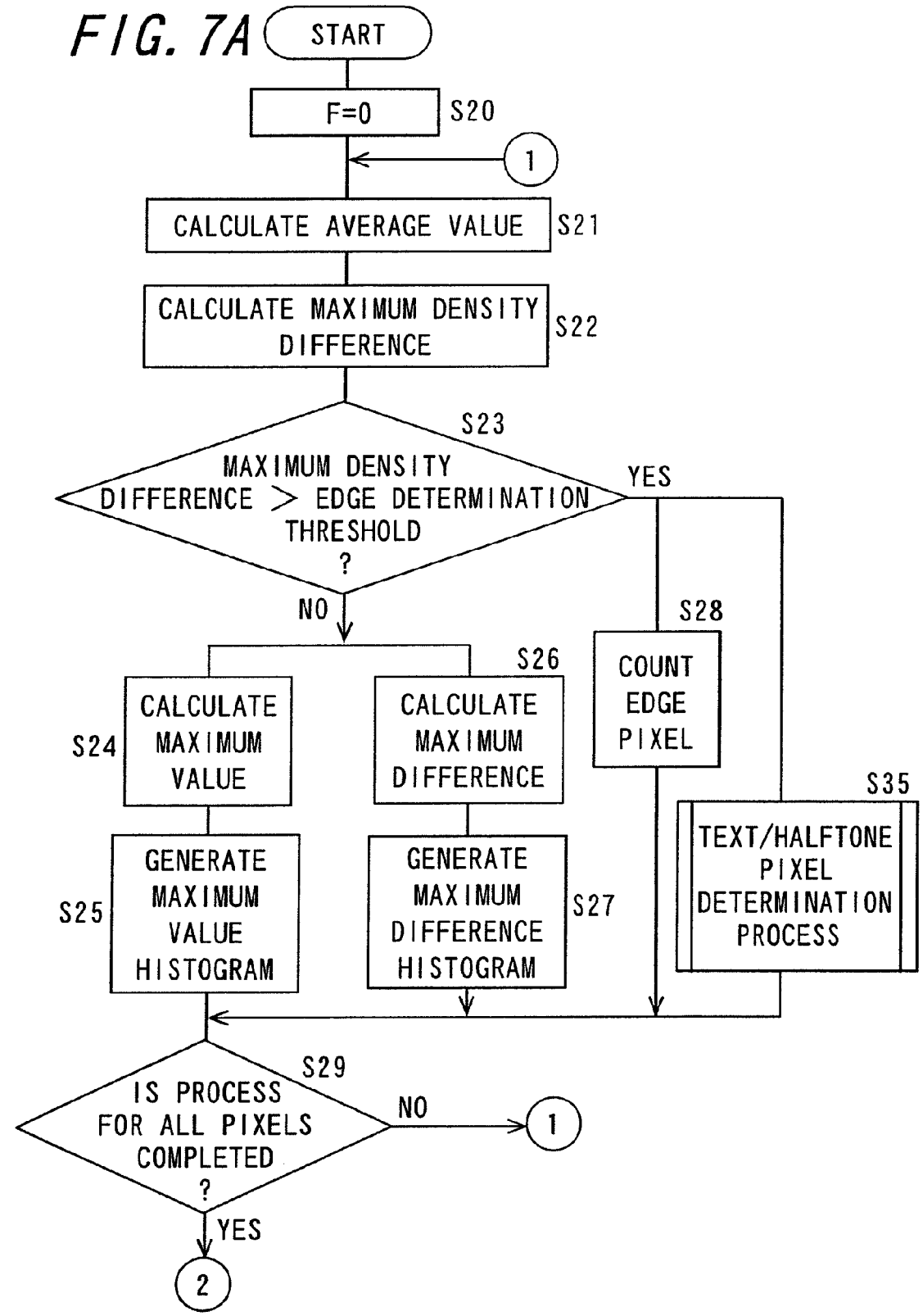

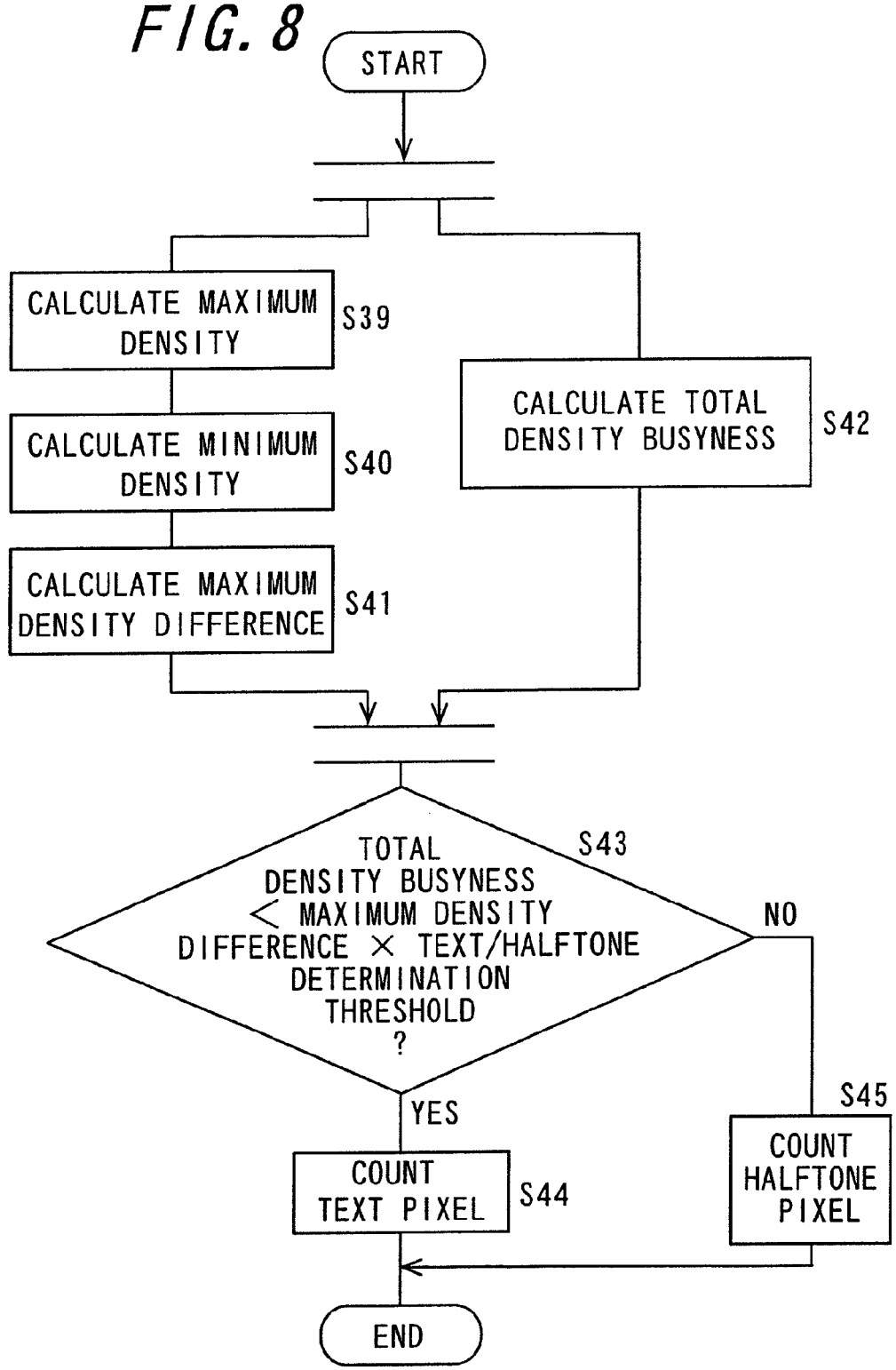

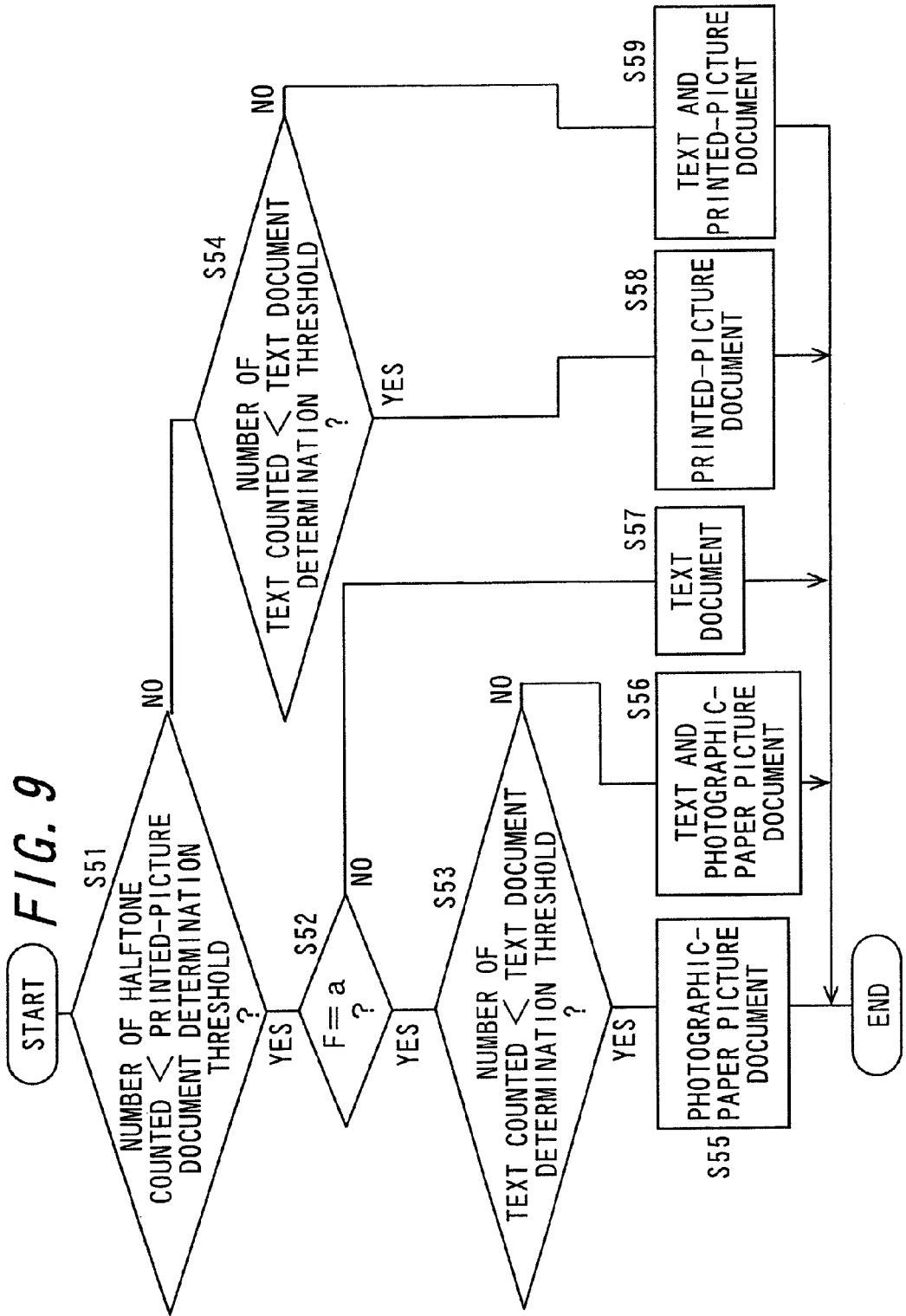

IMAGE PROCESSING APPARATUS, IMAGE FORMING APPARATUS, IMAGE PROCESSING METHOD AND COMPUTER-READABLE RECORDING MEDIUM

CROSS-REFERENCE TO RELATED APPLICATION

This application claims priority to Japanese Patent Application No. 2007-200193, which was filed on Jul. 31, 2007, the contents of which are incorporated herein by reference in its entirety.

BACKGROUND OF THE INVENTION

1. Field of the Invention

The present invention relates to an image processing apparatus, an image forming apparatus, an image processing method and a computer-readable recording medium that determine whether a document to be read is a double-sided document or a single-sided document.

2. Description of the Related Art

In a copier or image reading apparatus, when a double-sided document is copied by an automatic document feeding apparatus, etc., or a document image is sent by electronic mail to a predetermined e-mail address as scan to e-mail, if a plurality of documents to be read include both single-sided documents and double-sided documents, first, a user needs to separate the documents into single-sided documents and double-sided documents by hand and then needs to perform reading operation on respective documents. Hence, the user needs to rearrange outputted documents in the original order.

On the other hand, if reading is performed without thus separating the documents, unwanted blank sheets are outputted. Particularly when color blank sheets are mixed, color toner (ink) is to be wastefully consumed. Also, when read document image data is stored, storage space of a hard disk or the like is to be wastefully used.

To solve the problems described above, the following methods are proposed.

In an invention described in Japanese Unexamined Patent Publication JP-A 6-245003 (1994), in a file of documents including both double-sided documents and single-sided documents, distinction is made between a double-sided document and a single-sided document by the absence or presence of image. Determination on whether an image is absent or present is made such that the number of black pixels is counted to check whether a count value exceeds a certain reference value and if exceeds, then it is determined that an image is present. Alternatively, such determination is made based on the amount of compressed data of image.

In an invention described in Japanese Unexamined Patent Publication JP-A 9-261383 (1997), when making a distinction between a double-sided document and a single-sided document, a threshold is set to a level close to white and the number of pixels that are less than the threshold is counted, whereby determination is made on presence or absence of an image. When the above-described counted number is greater than a predetermined value which is set in advance, it is determined that an image is present.

In an invention described in Japanese unexamined Patent Publication JP-A 9-284490 (1997), a binary level of data of image is found and the number of pixels of the binary level is compared with a predetermined value to determine whether the data of image corresponds to a blank page document.

When the above-described conventional techniques are used, isolated dots which are not present in data of image, the influence of noise upon reading, and moreover, stains on a page background portion and dust attached to the page background portion are counted as black pixels and thus the accuracy of blank page image determination decreases. This occurs in both of the case of counting white pixels and the case of counting black pixels.

Furthermore, since the conventional techniques do not consider a color blank page document at all, determination cannot be made on a color blank page image.

SUMMARY OF THE INVENTION

An object of the invention is to provide an image processing apparatus, an image forming apparatus, an image processing method and a computer-readable recording medium that are capable of determining a blank page image with high accuracy regardless of monochrome or color.

The invention provides an image processing apparatus that determines, based on data of an image including a plurality of pixels, whether data of image is of a blank page image, the apparatus comprising:

an average value calculating section that calculates, for respective color components, an average value of pixel values within a first pixel block composed of a plurality of pixels including a pixel of interest, to define the calculated average values as a pixel value of the pixel of interest;

a histogram generating section that obtains, for respective pixels of interest, a maximum value of the average values among the color components and a maximum difference in the average values among the color components, based on the average values for the respective color components which are calculated by the average value calculating section, and generates histograms respectively for the maximum value and the maximum difference in which histograms a number of pixels for a density bin is considered as a frequency-of-occurrence value; and a determination section that obtains numbers of density bins that correspond to a frequency-of-occurrence value greater than or equal to a predetermined frequency-of-occurrence value in the histogram for the maximum value and the histogram for the maximum difference which are generated by the histogram generating section, respectively, and determines that the data of image is of a blank page image when both of the numbers of density bins are less than or equal to a bin threshold.

According to the invention, the average value calculating section calculates, for respective color components, an average value of pixel values within a first pixel block composed of a plurality of pixels including a pixel of interest, to define the calculated average values as a pixel value of the pixel of interest. Based on the average values for the respective color components which are calculated by the average value calculating section, the histogram generating section obtains, for respective pixels of interest, a maximum value of the average values among the color components and a maximum difference in the average values among the color components, and generates histograms respectively for the maximum value and the maximum difference in which histograms a number of pixels for a density bin is considered as a frequency-of-occurrence value.

The determination section obtains the numbers of density bins that correspond to a frequency-of-occurrence value greater than or equal to a predetermined frequency-of-occurrence value in the histogram for the maximum value and the histogram for the maximum difference which are generated by the histogram generating section, respectively, and determines that the data of image is of a blank page image when both of the numbers of density bins are less than or equal to a bin threshold.

With this configuration, the influences of isolated dots and noise upon reading, and moreover, the influences of stains on a page background portion and dust attached to the page background portion can be suppressed, enabling to determine a blank page image with high accuracy regardless of monochrome or color.

Further, in the invention, it is preferable that the image processing apparatus further comprises a pixel determining section that calculates, for respective color components, density information about density in a second pixel block composed of a plurality of pixels including a pixel of interest, compares the calculated density information with a predetermined density threshold to determine whether the pixel of interest is an edge pixel, and counts a number of pixels determined to be edge pixels, and the determination section determines that the data of image is of a blank page image when both of the numbers of density bins are less than or equal to the bin threshold and the number of pixels determined to be edge pixels is less than or equal to a number-of-pixel threshold.

According to the invention, the pixel determining section calculates, for respective color components, density information about density (pixel value) in a second pixel block composed of a plurality of pixels including a pixel of interest, compares the calculated density information with a predetermined density threshold to determine whether the pixel of interest is an edge pixel, and counts the number of pixels determined to be edge pixels.

The determination section determines that the data of image is of a blank page image when both of the numbers of density bins are less than or equal to the bin threshold and the number of pixels determined to be edge pixels is less than or equal to a number-of-pixel threshold.

By considering the number of edge pixels as a criterion, a blank page document determination can be made with higher accuracy.

Further, the invention provides an image forming apparatus including the above-described image processing apparatus.

According to the invention, since the image forming apparatus includes the above-described image processing apparatus, a blank page document determination can be made with high accuracy and the amount of use of color materials, such as toner and ink, can be reduced, enabling to provide an easy-to-use image forming apparatus by which troublesome work for the user is saved.

Further, the invention provides an image processing method in which based on data of image including a plurality of pixels, it is determined whether the data of image is of a blank page image, the method comprising:

an average value calculation step of calculating, for respective color components, an average value of pixel values within a first pixel block composed of a plurality of pixels including a pixel of interest, to define the calculated average values as a pixel value of the pixel of interest;

a histogram generation step of obtaining, for respective pixels of interest, a maximum value of the average values among the color components and a maximum difference in the average values among the color components, based on the average values for the respective color components which are calculated in the average value calculation step, and generating histograms respectively for the maximum value and the maximum difference in which histograms a number of pixels for a density bin is considered as a frequency-of-occurrence value; and a determination step of obtaining numbers of density bins that correspond to a frequency-of-occurrence value greater than or equal to a predetermined frequency-of-occurrence value in the histogram for the maximum value and the histogram for the maximum difference which are generated in the histogram generation step, respectively, and determining that the data of image is of a blank page image when both of the numbers of density bins are less than or equal to a bin threshold.

According to the invention, in the average value calculation step, an average value of pixel values is calculated for respective color components within a first pixel block composed of a plurality of pixels including a pixel of interest, to define the calculated average values as a pixel value of the pixel of interest. In the histogram generation step, based on the average values for the respective color components which are calculated in the average value calculation step, a maximum value of the average values among the color components and a maximum difference in the average values among the color components are found for respective pixels of interest, and histograms respectively for the maximum value and the maximum difference are generated in which histograms a number of pixels for a density bin is considered as a frequency-of-occurrence value.

In the determination step, the numbers of density bins that correspond to a frequency-of-occurrence value greater than or equal to a predetermined frequency-of-occurrence value are found in the histogram for the maximum value and the histogram for the maximum difference which are generated in the histogram generation step, respectively, and it is determined that the data of image is of a blank page image when both of the numbers of density bins are less than or equal to a bin threshold.

With this configuration, the influences of isolated dots and noise upon reading, and moreover, the influences of stains on a page background portion and dust attached to the page background portion can be suppressed, enabling to determine a blank page image with high accuracy regardless of monochrome or color.

Further, in the invention, it is preferable that the image processing method further comprises a pixel determination step of calculating, for respective color components, density information about density in a second pixel block composed of a plurality of pixels including a pixel of interest, comparing the calculated density information with a predetermined density threshold to determine whether the pixel of interest is an edge pixel, and counting a number of pixels determined to be edge pixels, and in the determination step, it is determined that the data of image is of a blank page image when both of the numbers of density bins are less than or equal to the bin threshold and the number of pixels determined to be edge pixels is less than or equal to a number-of-pixel threshold.

According to the invention, in the pixel determination step, density information about density is calculated for respective color components in a second pixel block composed of a plurality of pixels including a pixel of interest, the calculated density information is compared with a predetermined density threshold to determine whether the pixel of interest is an edge pixel, and the number of pixels determined to be edge pixels is counted.

In the determination step, it is determined that the data of image is of a blank page image when both of the numbers of density bins are less than or equal to the bin threshold and the number of pixels determined to be edge pixels is less than or equal to a number-of-pixel threshold.

By considering the number of edge pixels as a criterion, a blank page document determination can be made with higher accuracy.

Further, an image processing program for causing a computer to perform the above-described image processing method may be provided.

Further, a computer-readable recording medium on which an image processing program for causing a computer to perform the above-described image processing method is recorded may be provided.

BRIEF DESCRIPTION OF THE DRAWINGS

Other and further objects, features, and advantages of the invention will be more explicit from the following detailed description taken with reference to the drawings wherein:

FIG. 1 is a block diagram showing a configuration of an image forming apparatus according to one embodiment of the invention;

FIG. 2 is a block diagram showing a configuration of the document type automatic discrimination section;

FIGS. 3A and 3B are flowcharts showing a determination process performed by the document type automatic discrimination section;

FIGS. 5A to 5C are diagrams showing examples of the maximum difference histogram;

FIGS. 7A and 7B are flowchart showing a discrimination process of the document type automatic discrimination section;

FIG. 8 is a flowchart showing a document determination process;

FIG. 9 is a flowchart showing a determination process;

DETAILED DESCRIPTION

Figure 3B:
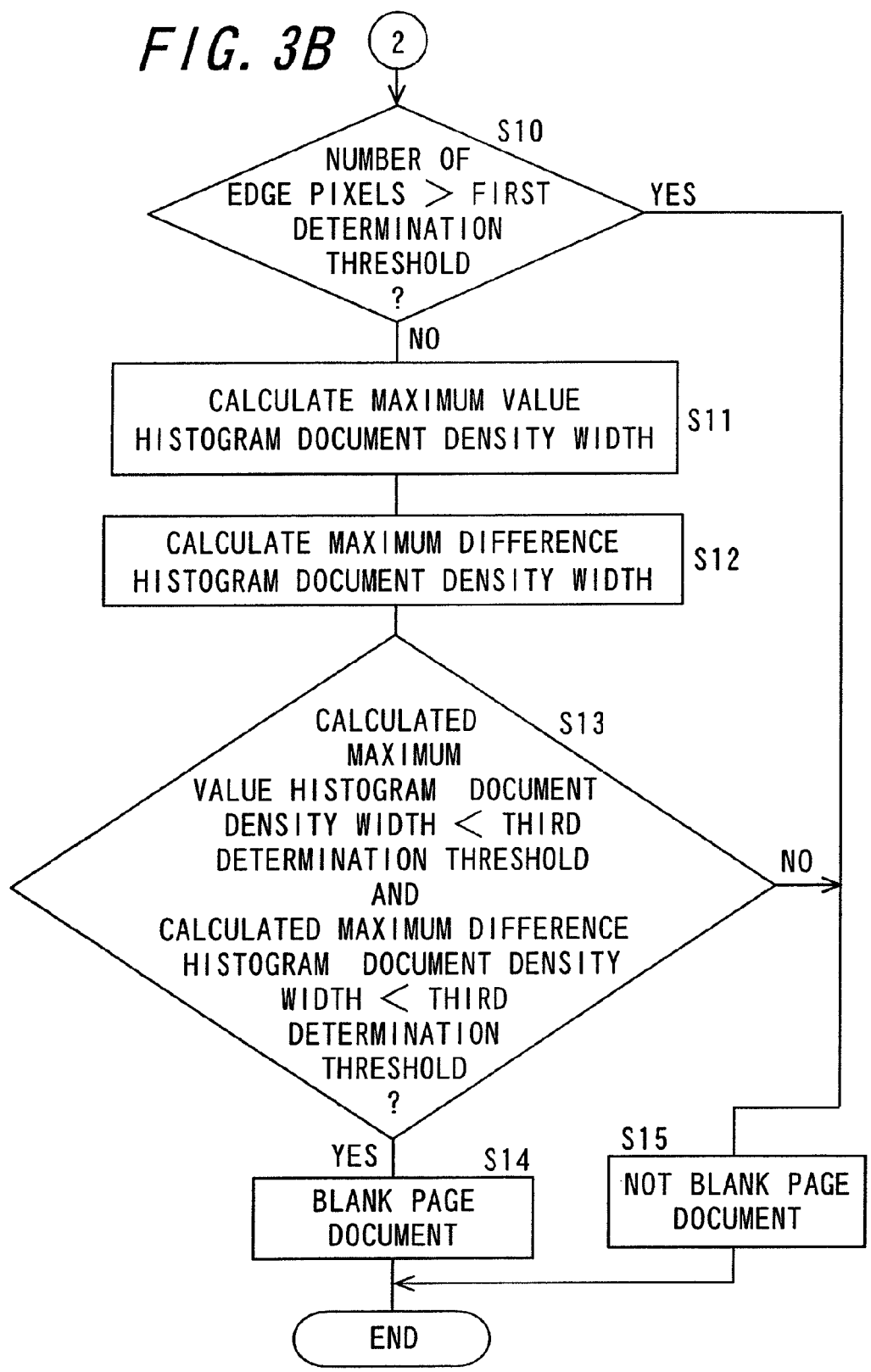

Now referring to the drawings, preferred embodiments of the invention are described below.

FIG. 1 is a block diagram showing a configuration of an image forming apparatus 1 according to one embodiment of the invention. In the present embodiment, the image forming apparatus 1 is applied to an electrophotographic digital color copier.

The image forming apparatus 1 includes a color image input apparatus 2, a color image processing apparatus 3, a color image output apparatus 4, and an operation panel 5. The color image processing apparatus 3 includes an A/D (analogue/digital) conversion section 11, a shading correction section 12, a document type automatic discrimination section 13, an input tone correction section 14, a segmentation process section 15, a color correction section 16, a black generation and under color removal section 17, a spatial filter process section 18, an output tone correction section 19, and a tone reproduction process section 20.

The color image input apparatus 2 which is an image reading section includes, for example, a scanner section (not shown) including a CCD (Charge Coupled Device) image sensor. The color image input apparatus 2 reads a reflected light image from a document by the CCD image sensor as data of image composed of analogue signals respectively corresponding to RGB (R: Red, G: Green, and B: Blue) and representing the reflectivity of reflected light from a recording medium such as paper on which a document image is recorded, and inputs the data of image to the color image processing apparatus 3. The data of image of analogue signals to be provided to the color image processing apparatus 3 from the color image input apparatus 2 is rasterized.

The data of image read by the color image input apparatus 2 is transmitted to the A/D conversion section 11, the shading correction section 12, the document type automatic discrimination section 13, the input tone correction section 14, the segmentation process section 15, the color correction section 16, the black generation and under color removal section 17, the spatial filter process section 18, the output tone correction section 19, and the tone reproduction process section 20 which are included in the color image processing apparatus 3, in this order and outputted to the color image output apparatus 4 as data of image represented by digital color signals respectively corresponding to CMYK (C: Cyan, M: Magenta, Y: Yellow, and K: Black).

The A/D (analogue/digital) conversion section 11 converts the data of image of analogue signals respectively corresponding to RGB into data of image of digital signals. The shading correction section 12 performs a process of removing various distortions occurring in a lighting system, an image focusing system, and an image sensing system of the color image input apparatus 2, on the data of image of digital signals respectively corresponding to RGB, which is sent from the A/D conversion section 11. Also, the shading correction section 12 makes a color balance adjustment.

The document type automatic discrimination section 13 converts the RGB signals (RGB reflectivity signals) from which various distortions have been removed and on which a color balance adjustment has been made by the shading correction section 12, into signals, such as density (pixel value) signals, which are easy for the color image processing apparatus 3 to process, and determines whether the document is a blank document (a non-image document, a blank page document). If it is determined that the document is a blank document, then subsequent processes are cancelled. If it is determined that the document is not a blank document, then the subsequent processes continue.

The document type automatic discrimination section 13 may be configured to make not only a blank document determination but also a document type discrimination such as whether the document is a text document or a printed-picture document or a text and printed-picture document including both text and a printed-picture.

A document type discrimination signal representing a document type and generated by the document type automatic discrimination section 13 is outputted to the input tone correction section 14, the color correction section 16, the black generation and under color removal section 17, the spatial filter process section 18, and the tone reproduction process section 20. Note that a detail of the document type automatic discrimination section 13 will be described later.

The input tone correction section 14 performs a process of removing background density and an image quality adjustment process such as contrast. The color of the background (a sheet on which text, etc., are printed) of a document varies. For example, the background color of a yellowish one, such as coarse paper, needs to be treated as white; otherwise, when printing out the document, extra recording agent is also used for a blank portion (background portion). Therefore, by the input tone correction section 14, background density is removed, i.e., the density of the background is brought to the density of a white color, and at the same time, contrast is adjusted. The input tone correction section 14 provides data of image composed of density signals respectively corresponding to RGB, to the segmentation process section 15.

The segmentation process section 15 determines to which one of a page background region, a photograph (photographic-paper picture, continuous tone) region like a silver halide photography, a text region, and a halftone region respective pixels in the data of image inputted to the color image processing apparatus 3 by the density signals respectively corresponding to RGB, belong, and determine whether they are color or monochrome. In the present embodiment, the segmentation indicates that a pixel in the data of one image is separated into either one of a text region, a photograph region (continuous tone region), a page background region or a halftone region, and color or monochrome. The text region represents characters including text and symbols. The page background region represents a background portion of a document. The segmentation process section 15 outputs, based on segmentation results, a segmentation class signal indicating to which region respective pixels belong, to the color correction section 16, the black generation and under color removal section 17, the spatial filter process section 18, and the tone reproduction process section 20, and outputs to the subsequent color correction section 16 the density signals, without any modification, which respectively correspond to RGB and which are outputted from the input tone correction section 14.

The color correction section 16 converts the density signals (input signals) respectively corresponding to RGB provided from the segmentation process section 15, into density signals (hereinafter, referred to as CMY signals) respectively corresponding to CMY, according to the segmentation class signal provided from the segmentation process section 15. The conversion of the density signals respectively corresponding to RGB into signals respectively corresponding to CMY is performed by the color correction section 16. In order to implement faithful color reproduction, the color correction section 16 performs a process of removing color impurity based on the spectral characteristics of CMY color materials containing unnecessary absorption components. The color correction section 16 also performs color conversion based on the document type discrimination signal provided from the document type automatic discrimination section 13.

The black generation and under color removal section 17 performs a black generation process in which a black signal corresponding to black (K) is generated from the CMY signals corresponding to CMY which have been subjected to color correction by the color correction section 16, and a process of generating new CMY signals by subtracting the K signal obtained through the black generation from the original CMY signals. With these processes, the CMY signals are converted into signals of four colors, CMYK (hereinafter, referred to as CMYK signals).

The black generation and under color removal section 17 performs, as an example of the black generation process, black generation by skeleton black. In the black generation by skeleton black, when the input-output characteristics of a skeleton curve is y=f(x), densities respectively corresponding to C, M, and Y to be inputted are respectively C, M, and Y, densities respectively corresponding to C, M, Y, and K to be outputted are respectively C', M', Y', and K', and the UCR (Under Color Removal) rate is α (0<α<1), in a black generation and under color removal process, by the following equation (1), density signals of three colors, CMY, are converted into density signals of four colors, CMYK.

$$\begin{cases} K' = f\{\min(C, M, Y)\} \\ C' = C - \alpha K' \\ M' = M - \alpha K' \\ Y' = Y - \alpha K' \end{cases} \quad (1)$$

The spatial filter process section 18 performs a spatial filter process using a digital filter which is set in advance for respective regions, on the data of image of CMYK signals provided from the black generation and under color removal section 17, according to the segmentation class signal provided from the segmentation process section 15, to correct spatial frequency characteristics, whereby a blur of an output image and deterioration of graininess are prevented.

As with the spatial filter process section 18, the tone reproduction process section 20 performs a predetermined process on the data of image of CMYK signals provided from the output tone correction section 19, according to the segmentation class signal provided from the segmentation process section 15. For example, for a region segmented into the text region by the segmentation process section 15, in order particularly to improve the reproducibility of achromatic text or chromatic text, the amount of high-frequency component is emphasized by an edge enhancement process in a spatial filter process performed by the spatial filter process section 18, and the tone reproduction process section 20 performs a binarization or multi-level dithering process for a high-resolution screen suitable for reproducing high-frequency component. For a region segmented into the halftone region by the segmentation process section 15, the spatial filter process section 18 performs a low-pass filtering process to remove input halftone components. Then, the output tone correction section 19 performs an output tone correction process in which signals, such as density signals, are converted into a halftone area ratio which is a characteristic value of the color image output apparatus 4, and thereafter, finally, the tone reproduction process section 20 performs a tone reproduction process (halftone generation) in which an image is separated into pixels such that their respective tones can be reproduced. For a region segmented into the photograph region by the segmentation process section 15, a binarization or multi-level dithering process on a screen suitable for tone reproduction is performed.

The operation panel 5 includes, for example, a display section, such as a liquid crystal display, and operation keys. Information to be inputted from the operation panel 5 is provided to a control section (not shown). The control section controls the operations of the color image input apparatus 2, the color image processing apparatus 3, and the color image output apparatus 4, according to the information inputted from the operation panel 5.

Data of image to be outputted from the tone reproduction process section 20, i.e., data of image having been subjected to the foregoing processes, is temporarily stored in a storage section, read out at predetermined timing, and inputted to the color image output apparatus 4.

The color image output apparatus 4 is an image forming section and outputs the data of image as an image to a recording medium (e.g., a sheet material such as paper). The color image output apparatus 4 is capable of forming an image on a recording medium using recording agents of two or more colors. In the present embodiment, the color image output apparatus 4 can form an image on a recording medium using recording agents of C, M, Y, and K colors. The color image output apparatus 4 forms an image using a recording agent of C for data of image corresponding to C, forms an image using a recording agent of M for data of image corresponding to M, forms an image using a recording agent of Y for data of image corresponding to Y, and forms an image using a recording agent of K for data of image corresponding to K. Although in the present embodiment the color image output apparatus 4 is implemented by an electrophotographic printer apparatus, in another embodiment of the invention, the color image output apparatus 4 may be implemented by an inkjet printer apparatus. Respective sections of the color image processing apparatus 3 is controlled by a control section (not shown). The control section includes a CPU (Central Processing Unit) and a storage medium storing a control program which is executed and processed by the CPU. When the CPU executes the control program, the color image input apparatus 2, the color image processing apparatus 3, and the color image output apparatus 4 are controlled.

FIG. 2 is a block diagram showing a configuration of the document type automatic discrimination section 13. FIGS. 3A and 3B are flowcharts showing a determination process performed by the document type automatic discrimination section 13.

As shown in FIG. 2, the document type automatic discrimination section 13 includes an average value calculating section 21, a pixel determining section 22, a arithmetic section 23, a histogram generating section 24, an edge pixel counting section 25, a determination section 26, an edge determination threshold setting section 27, a first determination threshold setting section 28, a second determination threshold setting section 29, and a third determination threshold setting section 30.

The average value calculating section 21 calculates, for respective RGB planes (respective color components), an average value of density values within a block (e.g., 7×7 pixels) composed of a plurality of pixels including a pixel of interest, to define the average values as a pixel value of the pixel of interest (step S1). The pixel determining section 22 calculates, for respective RGB planes (each color component), a maximum density difference within a block (e.g., 7×7 pixels) composed of a plurality of pixels and including a pixel of interest (step S2), and compares the maximum density differences with an edge determination threshold (e.g., 30) provided from the edge determination threshold setting section 27 to determine whether the pixel of interest in the block belongs to an edge pixel (step S3). Specifically, when any of the maximum density differences of a plurality of color components is greater than or equal to the threshold, the pixel of interest is determined to be an edge pixel (step S8). For a method of determining an edge, in addition to a method using such maximum density differences, a method may be employed in which a variance value is found and if the variance value is greater than or equal to a threshold, then a pixel of interest is determined to be an edge pixel.

Pixels that are determined to be edge pixels by the pixel determining section 22 are counted by the edge pixel counting section 25.

Subsequently, the arithmetic section 23 compares the average values for the respective planes (respective color components) of the pixel of interest which are calculated by the average value calculating section 21, to calculate, for respective pixels of interest, a maximum value and a maximum difference in the average values among the color components (steps S4 and S6). Then, the histogram generating section 24 generates histograms respectively for the maximum value and the maximum difference (steps S5 and S7). The number of density bins is, for example, 16.

It is determined whether the process for all pixels is completed (step S9). If not completed, then the above-described processes from step S1 to step S8 are repeated on a next pixel block. If completed, the determination section 26 then compares the number of edge pixels counted by the edge pixel counting section 25 with a first determination threshold (e.g., 5,000) provided from the first determination threshold setting section 28 (step S10). If the number of edge pixels is greater than the first determination threshold, it indicates that either a text region or a halftone region is present, and thus, it is determined that the document is not a blank page document (step S15). Furthermore, the determination section 26 compares the number of edge pixels counted by the edge pixel counting section 25 with a first determination threshold (e.g., 5,000) provided from the first determination threshold setting section 28. If the number of edge pixels is less than or equal to the first determination threshold, then it is determined that the document is either a blank page document or a photographic-paper picture document. If it is determined to be a blank page document or a photographic-paper picture document, then the determination section 26 compares the histograms respectively for the maximum value and the maximum difference generated by the histogram generating section 24, with a second determination threshold (e.g., 500) provided from the second determination threshold setting section 29, to calculate, for each of the maximum value and the maximum difference, a total value for the number of bins in which the frequency-of-occurrence value is greater than the second determination threshold, to use the total values respectively as a maximum value histogram document density width and a maximum difference histogram document density width (steps S11 and S12)

Each of the calculated maximum value histogram document density width and maximum difference histogram document density width is compared with a third determination threshold (e.g., 3) provided from the third determination threshold setting section 30 (step S13). If each of the calculated maximum value histogram document density width and maximum difference histogram document density width is smaller than the third determination threshold, then the document is determined to be a blank page document (step S14).

Although the above shows the configuration including the pixel determining section 22, without providing the pixel determining section 22, by using the average values calculated by the average value calculating section 21, a maximum value and a maximum difference in the average values for respective color components may be calculated, histograms respectively for the maximum value and the maximum difference may be generated, and determination on whether the document is a blank page document may be made. In this case, in addition to determinations of a maximum value histogram document density width and a maximum difference histogram document density width, the number of maximum difference histogram document density widths is detected and if each of the maximum value histogram document density width and the maximum difference histogram document density width is smaller than a third determination threshold (e.g., 3) and the number of maximum difference histogram document density widths is 1, then the document is determined to be a blank page document.

Histograms which are generated by the histogram generating section 24 will be described in detail below.

Figure 4A:
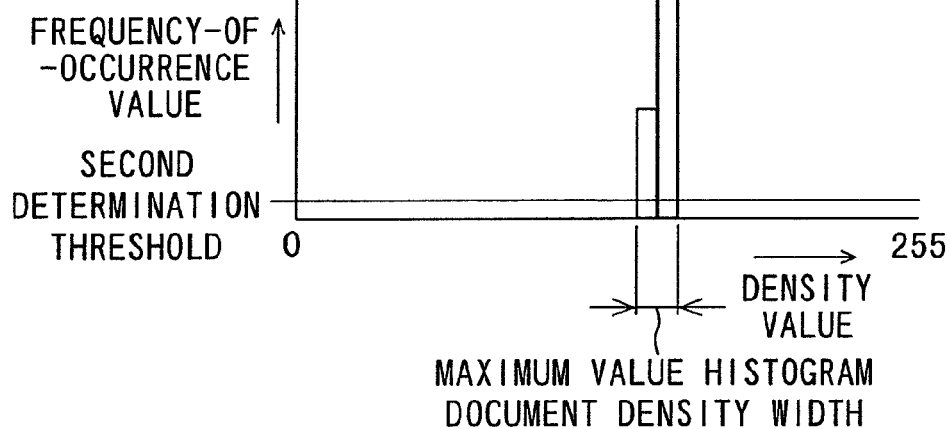
FIGS. 4A to 4C are diagrams showing examples of the maximum value histogram.
Figure 4B:
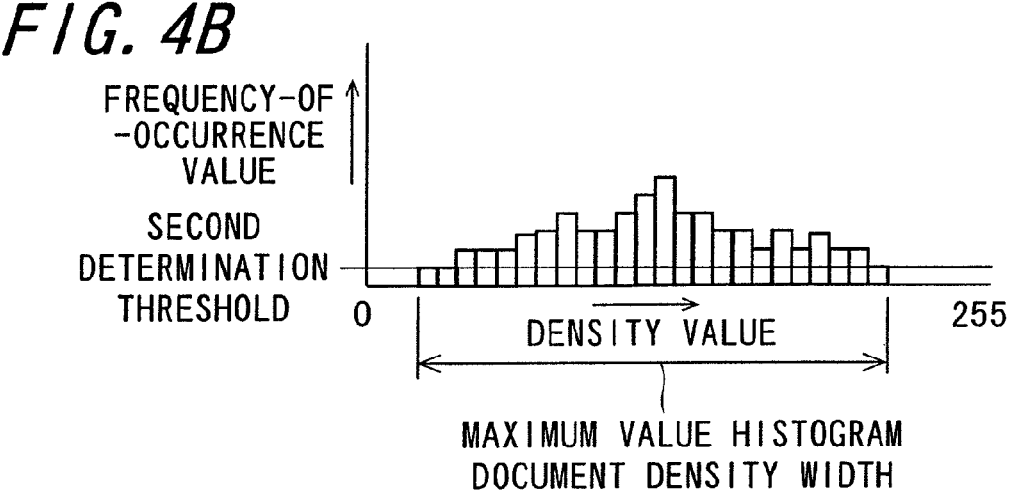
Figure 4C:
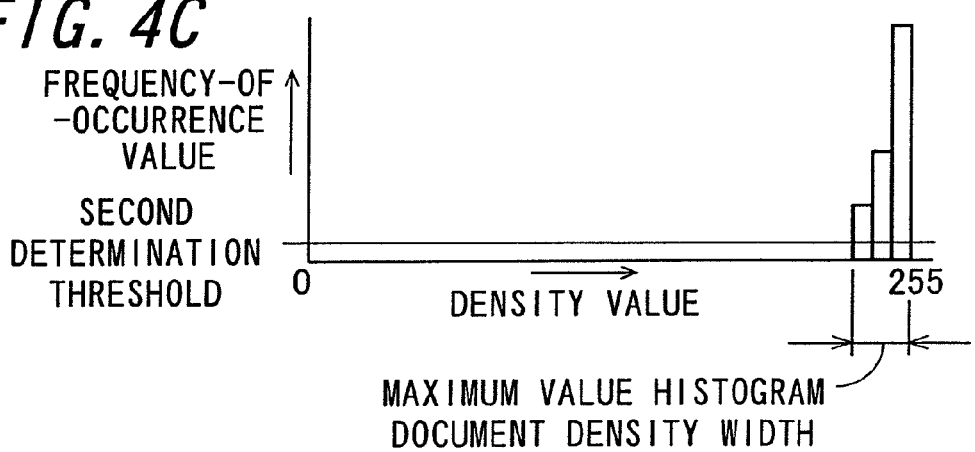

FIGS. 4A to 4C are diagrams showing examples of the maximum value histogram and FIGS. 5A to 5C are diagrams showing examples of the maximum difference histogram.

Examples of histograms for a blank page document are shown in FIGS. 4A and 5A.

For a blank page document, since there are only pixels of a monochrome density, as shown in the drawings, both a maximum value histogram and a maximum difference histogram are formed such that frequencies of occurrence are present only in limited density bins (e.g., one to two bins). Also, a document with a larger density value (pixel value) where a frequency of occurrence of the maximum value histogram is present can be considered to be a brighter document and a document with a smaller density value can be considered to be a darker document. For the maximum difference histogram, a document with a larger density value where a frequency of occurrence is present can be considered to be a chromatic document and a document with a smaller density value can be considered to be a achromatic document. For example, when in the maximum value histogram, a frequency of occurrence is present at one location where the density value is 255 and in the maximum difference histogram, a frequency of occurrence is present at one location where the density value is 0, the document is determined to be a blank document.

Examples of histograms for a photographic-paper picture document are shown in FIGS. 4B and 5B.

Since a photographic-paper picture document is represented by various densities, both a maximum value histogram and a maximum difference histogram are formed such that frequencies of occurrence are present in broad density bins. For the maximum difference histogram, a document with frequencies of occurrence present in broad density bins can be considered to be a chromatic document and a document with frequencies of occurrence present in limited density bins can be considered to be a monochrome photographic-paper picture document. Particularly, a document with frequencies of occurrence present in low density bins can be considered to be an achromatic photographic-paper picture document. For example, when in both the maximum value histogram and the maximum difference histogram, frequencies of occurrence are present in a broad density range, the document is determined to be a color photographic-paper picture document Examples of histograms for a text document are shown in FIGS. 4C and 5C.

For a text document, since a large background density is present, both a maximum value histogram and a maximum difference histogram are formed in a manner very similar to the blank page document. However, in the maximum difference histogram, frequencies of occurrence are present in density bins of text portions, and above all, the number of edge pixels by text is present and thus a clear distinction can be made between a blank page document and a text document.

For a halftone document too, since frequencies of occurrence are present in various density bins, both a maximum value histogram and a maximum difference histogram are formed such that frequencies of occurrence are present in a broad density range. Note, however, that for a halftone document since a halftone is counted as an edge, the halftone document can be distinguished from a photographic-paper picture document.

The case will be described in which the document type automatic discrimination section 13 makes a type discrimination between a blank page document and other documents.

Figure 6:
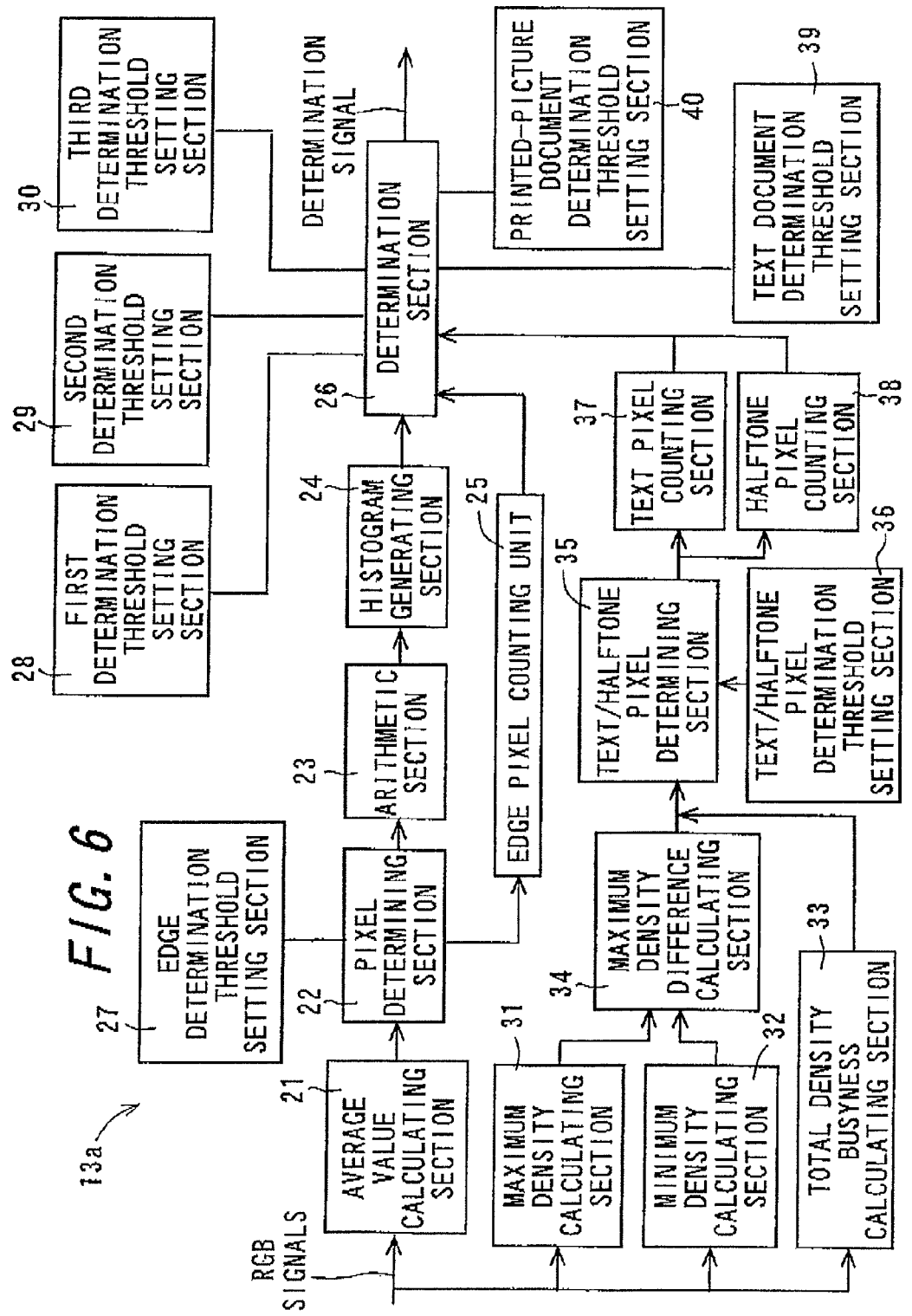
FIG. 6 is a block diagram showing a configuration of a document type automatic discrimination section that makes a type determination between a blank page document and other documents.
Figure 7B:
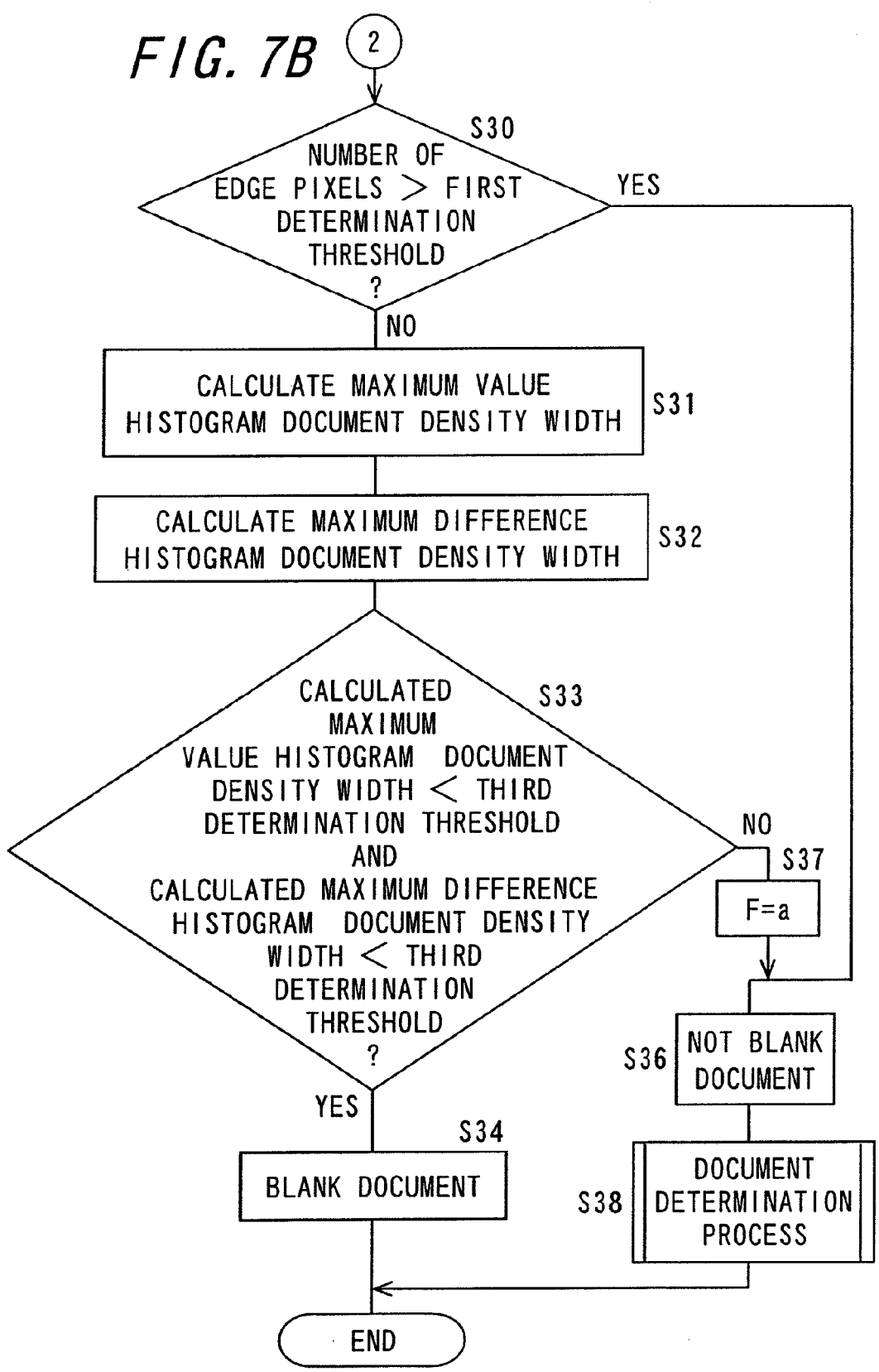

FIG. 6 is a block diagram showing a configuration of a document type automatic discrimination section 13a that makes a type discrimination between a blank page document and other documents. FIGS. 7A and 7B are flowcharts showing a discrimination process of the document type automatic discrimination section 13a. FIG. 8 is a flowchart showing a document determination process.

Those parts that perform the same operations as parts constituting the document type automatic discrimination section 13 shown in FIG. 2 are denoted by the same reference numerals and description thereof will be omitted.

First, a flag F which is used in a determination process (described later) is initialized such that F=0 (step S20).

The operations in steps S21 to S34 are the same as those in steps S1 to S14 in the flowcharts shown in FIGS. 3A and 3B and thus description thereof will be omitted.

RGB signals inputted to the document type automatic discrimination section 13a are inputted to a maximum density calculating section 31, a minimum density calculating section 32, and a total density busyness calculating section 33, in parallel with the above-described processes in the average value calculating section 21, the pixel determining section 22, the arithmetic section 23, and the histogram generating section 24.

Pixels that are determined to be edge pixels by the pixel determining section 22 are counted by the edge pixel counting section 25 and a count value is outputted to the determination section 26. A text/halftone pixel determining section 35 performs a text/halftone pixel determination process in which determination on whether the pixel is a text pixel or a halftone pixel is made (step S35).

Referring to FIG. 8, in the text/halftone pixel determination process, first, the maximum density calculating section 31 and the minimum density calculating section 32 calculate a maximum density value and a minimum density value within, for example, a 7×7 pixel block including a pixel of interest (steps S39 and S40). A maximum density difference calculating section 34 calculates a maximum density difference using the calculated minimum density value and maximum density value (step S41).

The total density busyness calculating section 33 calculates, in the 7×7 pixel block, a total density busyness which is the sum total of absolute values of density differences between adjacent pixels (step S42). For example, a total density busyness for a main scanning direction and a total density busyness for a sub-scanning direction are calculated and a sum of them is used as a calculated total density busyness. Furthermore, the calculated total density busyness is compared with a product of a text/halftone pixel determination threshold provided from a text/halftone pixel determination threshold setting section 36 and the calculated maximum density difference, to make determination between a text region and a halftone region (step S43). Note that the text/halftone pixel determination can be made by the steps described in, for example, Japanese Unexamined Patent Publication JP-A 2002-232708.

A pixel that is determined to be a text pixel is counted by a text pixel counting section 37 (step S44) and a pixel that is determined to be a halftone pixel is counted by a halftone pixel counting section 38 (step S45).

Returning to FIGS. 7A and 7B, when the determination section 26 determines that the document is not a blank document (step S36), the determination section 26 performs an overall document determination process using a result that the document is determined to be a photographic-paper picture document (flag F=a, step S37), the number of text counted, and the number of halftone counted (step S38).

FIG. 9 is a flowchart showing a determination process.

First, the determination section 26 compares the number of halftone counted with a printed-picture document determination threshold (e.g., 20% of the total number of pixels) which is set by a printed-picture document determination threshold setting section 40 (step S51). If the number of halftone counted is smaller than the printed-picture document determination threshold, then it is determined whether the flag F=a (step S52).

If F=a is satisfied, then the determination section 26 compares the number of text counted with a text document determination threshold (e.g., 10% of the total number of pixels) which is set by a text document determination threshold setting section 39 (step S53). If the number of text counted is smaller than the text document determination threshold, then the document is determined to be a photographic-paper picture document (step S55), and if the number of text counted is greater than or equal to the text document determination threshold, then the document is determined to be a text and photographic-paper picture document (step S56). If F=a is not satisfied, then the document is determined to be a text document (step S57).

Furthermore, when the number of halftone counted is greater than or equal to the printed-picture document determination threshold, too, the determination section 26 compares the number of text counted with a text document determination threshold (e.g., 10% of the total number of pixels) which is set by the text document determination threshold setting section 39 (step S54). If the number of text counted is smaller than the text document determination threshold, then the document is determined to be a printed-picture document (step S58), and if the number of text counted is greater than or equal to the text document determination threshold, then the document is determined to be a text and printed-picture document (step S59).

Figure 10:
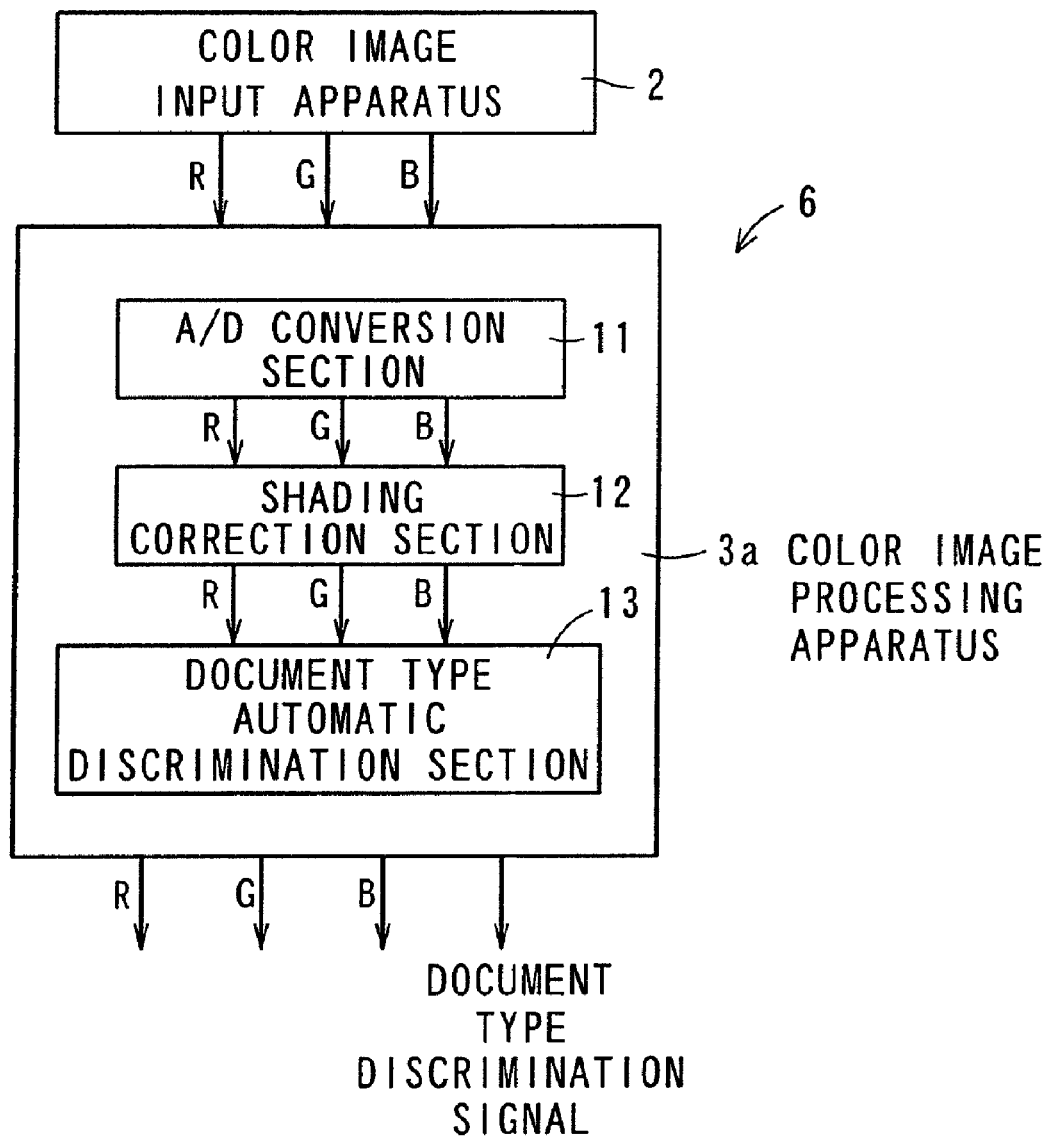
FIG. 10 is a block diagram showing a configuration of an image reading apparatus according to another embodiment of the invention.

FIG. 10 is a block diagram showing a configuration of an image reading apparatus 6 according to another embodiment of the invention.

The image reading apparatus 6 includes a color image input apparatus 2 and a color image processing apparatus 3*a*. The color image processing apparatus 3*a* includes an A/D conversion section 11, a shading correction section 12, and a document type automatic discrimination section 13.

The color image input apparatus (image reading section) 2 includes, for example, a scanner section including a CCD image sensor. The color image input apparatus 2 reads a reflected light image from a document by the COD image sensor as RGB analogue signals, and inputs the RGB analogue signals to the color image processing apparatus 3*a*.

The analogue signals read by the color image input apparatus 2 are transmitted, within the color image processing apparatus 3*a*, to the A/D conversion section 11, the shading correction section 12, and the document type automatic discrimination section 13 in this order.

The A/D conversion section 11 converts the RGB analogue signals into digital signals. The shading correction section 12 performs a process of removing various distortions occurring in a lighting system, an image focusing system, and an image sensing system of the color image input apparatus 2, on the digital RGB signals sent from the A/D conversion section 11. Also, the shading correction section 12 makes a color balance adjustment.

The document type automatic discrimination section 13 converts the RGB signals (RGB reflectivity signals) from which various distortions have been removed and on which a color balance adjustment has been made by the shading correction section 12, into signals, such as density (pixel value) signals, which are easy for the color image processing apparatus 3*a* to process, and determines whether the document is a blank page document. The document type automatic discrimination section 13 may be configured to make not only a blank page document determination but also a document type discrimination such as whether the document is a text document or a printed-picture document or a text and printed-picture document including both text and a printed-picture.

Data of image and a document type discrimination signal outputted from the image reading apparatus 6 are transmitted to a printer, a multi-function peripheral, or a computer through a network.

As another embodiment of the invention, it is also possible to record an image processing method in which the above-described blank page image determination process is performed, in a computer-readable recording medium on which a program code (an executable program, an intermediate code program, and a source program) of a program to be executed by a computer is recorded.

Accordingly, the recording medium on which the program code is recorded that performs the image processing method in which the blank page image determination process is performed can be portably provided.

Note that in the present embodiment, as the recording medium, a memory which is not shown because processes are performed by a microcomputer, e.g., a ROM, itself may serve as a program medium, or alternatively, a program code reading apparatus, although not shown, may be provided as an external storage apparatus and by inserting the recording medium thereinto, the apparatus may serve as a readable program medium.

In any case, a stored program may be executed by a microprocessor accessing the program, or in any case, a scheme may be employed in which a program code is read, the read program code is downloaded into a program storage area (not shown) of a microcomputer, and the program code is executed. The program for download is stored in advance in a main body apparatus.

Here, the above-described program medium is a recording medium configured to be separable from a main body, and may be a medium that fixedly carries a program thereon, including a tape type, such as a magnetic tape or cassette tape, a disk type including a magnetic disk such as a flexible disk or hard disk or an optical disk such as a CD-ROM/MO/MD/DVD, a card type, such as an IC card (including a memory card)/optical card, or a semiconductor memory such as a mask ROM, EPROM (Erasable Programmable Read Only Memory), EEPROM (Electrically Erasable Programmable Read Only Memory), or flash ROM.

In the present embodiment, since a system configuration is capable of connecting a communication network including the Internet, the program medium may be a medium that carries thereon a program such that a program code is downloaded from the communication network in a flowing manner. Note that when a program code is thus downloaded from the communication network, the program for download may be stored in advance in a main body apparatus or may be installed from another recording medium. Note also that the invention can also be implemented in the form of a computer data signal in which the above-described program code is embodied by electronic transmission and which is embedded in a carrier wave.

The above-described recording medium is read by a program reading apparatus included in a digital color image forming apparatus or computer system, whereby the aforementioned image processing method is performed.

A computer system includes an image input apparatus such as a flatbed scanner, film scanner, or digital camera; a computer that performs various processes, such as the aforementioned image processing method, by a predetermined program being loaded; an image display device, such as a CRT display or liquid crystal display, that displays processing results produced by the computer; and a printer that outputs the processing results produced by the computer to paper, etc. The computer system further includes a network card, a modem, etc., that serve as a communicating section for establishing a connection to a server, etc., through a network.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus that determines, based on data of an image including a plurality of pixels, whether data of the image is of a blank page image, the apparatus comprising:
    an average value calculating section that calculates, for respective color components, an average value of pixel values within a first pixel block composed of a plurality of pixels including a pixel of interest, to define the calculated average values as a pixel value of the pixel of interest;
    a histogram generating section that obtains, for respective pixels of interest, a maximum value of the average values among the color components and a maximum difference in the average values among the color components, based on the average values for the respective color components which are calculated by the average value calculating section, and generates histograms respectively for the maximum value and the maximum difference in which histograms a number of pixels for a density bin is considered as a frequency-of-occurrence value;
    a determination section that obtains numbers of density bins that correspond to a frequency-of-occurrence value greater than or equal to a predetermined frequency-of-occurrence value in the histogram for the maximum value and the histogram for the maximum difference which are generated by the histogram generating section, respectively, and determines that the data of image is of a blank page image when both of the numbers of density bins are less than or equal to a bin threshold; and
    a pixel determining section that calculates, for respective color components, density information about density in a second pixel block composed of a plurality of pixels including a pixel of interest, compares the calculated density information with a predetermined density threshold to determine whether the pixel of interest is an edge pixel, and counts a number of pixels determined to be edge pixels, wherein
    the determination section determines that the data of image is of a blank page image when both of the numbers of density bins are less than or equal to the bin threshold and the number of pixels determined to be edge pixels is less than or equal to a number-of-pixel threshold.

2. An image forming apparatus including the image processing apparatus of claim 1.

3. An image processing method in which based on data of an image including a plurality of pixels, it is determined whether the data of the image is of a blank page image, the method comprising:
    an average value calculation step of calculating, for respective color components, an average value of pixel values within a first pixel block composed of a plurality of pixels including a pixel of interest, to define the calculated average values as a pixel value of the pixel of interest;
    a histogram generation step of obtaining, for respective pixels of interest, a maximum value of the average values among the color components and a maximum difference in the average values among the color components, based on the average values for the respective color components which are calculated in the average value calculation step, and generating histograms respectively for the maximum value and the maximum difference in which histograms a number of pixels for a density bin is considered as a frequency-of-occurrence value;
    a determination step of obtaining numbers of density bins that correspond to a frequency-of-occurrence value greater than or equal to a predetermined frequency-of-occurrence value in the histogram for the maximum value and the histogram for the maximum difference which are generated in the histogram generation step, respectively, and determining that the data of image is of a blank page image when both of the numbers of density bins are less than or equal to a bin threshold; and
    a pixel determination step of calculating, for respective color components, density information about density in a second pixel block composed of a plurality of pixels including the pixel of interest, comparing the calculated density information with a predetermined density threshold to determine whether the pixel of interest is an edge pixel, and counting a number of pixels determined to be edge pixels, wherein
    in the determination step, it is determined that the data of image is of a blank page image when both of the numbers of density bins are less than or equal to the bin threshold and the number of pixels determined to be edge pixels is less than or equal to a number-of-pixel threshold.

4. A computer-readable tangible recording medium encoded with instructions, wherein the instructions when executed on a computer perform an image processing method, the image processing method comprising:
    an average value calculation step of calculating, for respective color components, an average value of pixel values within a first pixel block composed of a plurality of pixels including a pixel of interest, to define the calculated average values as a pixel value of the pixel of interest;
    a histogram generation step of obtaining, for respective pixels of interest, a maximum value of the average values among the color components and a maximum difference in the average values among the color components, based on the average values for the respective color components which are calculated in the average value calculation step, and generating histograms respectively for the maximum value and the maximum difference in which histograms a number of pixels for a density bin is considered as a frequency-of-occurrence value;
    a determination step of obtaining numbers of density bins that correspond to a frequency-of-occurrence value greater than or equal to a predetermined frequency-of-occurrence value in the histogram for the maximum value and the histogram for the maximum difference which are generated in the histogram generation step, respectively, and determining that the data of image is of a blank page image when both of the numbers of density bins are less than or equal to a bin threshold; and a pixel determination step of calculating, for respective color components, density information about density in a second pixel block composed of a plurality of pixels including the pixel of interest, comparing the calculated density information with a predetermined density threshold to determine whether the pixel of interest is an edge pixel, and counting a number of pixels determined to be edge pixels, wherein in the determination step, it is determined that the data of image is of a blank page image when both of the numbers of density bins are less than or equal to the bin threshold and the number of pixels determined to be edge pixels is less than or equal to a number-of-pixel threshold.

* * * * *